2,776,925
Patented Jan. 8, 1957

2,776,925

ENZYMIC PRODUCTION OF DEXTRAN OF INTERMEDIATE MOLECULAR WEIGHTS

Julian Corman and Henry M. Tsuchiya, Peoria, Ill., assignors to the United States of America as represented by the Secretary of Agriculture No Drawing. Application October 3, 1952,
Serial No. 313,084

8 Claims. (Cl. 195—31)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the production of dextran of intermediate molecular weights by the action of dextranase upon dextran of relatively high molecular weight, and more particularly to the controlled enzymic cleavage of native dextran to produce pharmaceutically and industrially useful products of desired lower molecular weight.

Dextran is a carbohydrate gum of biological origin. It is a polymer primarily of glucose, its molecular weight ranging, in special circumstances, as low as 2,000, and as high as many millions. The biological product with which the art is familiar, and which may be termed "native dextran" usually consists of an admixture of high molecular weight dextrans and lower molecular weight dextrans, the former greatly predominating. Both high and low molecular weight dextrans are distinguished from other carbohydrate polymers of glucose by containing a predominance of 1–6 linkages between the anhydroglucose units of the molecule.

Dextran has generally found use as a carbohydrate gum having a wide variety of industrial applications. Many of its uses, particularly those relating to blood volume expanders, require a molecular weight range which is lower than that which predominates in the native dextran as commonly produced by microbiological synthesis. This high molecular weight dextran is produced by prior whole culture synthesis wherein the dextran-producing organisms remain in the synthesis liquors during the formation of the dextran, or by the recently developed enzymic synthesis wherein the dextran-producing enzyme (dextransucrase) is produced as in initial step, then separated from the microorganisms, and employed for the dextran synthesis as a separate step. This latter method of synthesis is disclosed and claimed in copending applications Serial No. 215,623, filed March 15, 1951, and now Patent No. 2,673,828, granted March 30, 1954, to Koepsell, Kazenko, Jeanes, Sharpe and Wilham, and Serial No. 256,586, filed November 15, 1951, and now Patent No. 2,686,147, granted August 10, 1954, to Tsuchiya and Koepsell.

Native dextran must, therefore, be broken down to the useful intermediate molecular weight ranges. Heretofore, this has been accomplished by hydrolysis with acid by methods known in the art. It has also been accomplished by pyrolysis and by ultrasonic treatment.

The prior methods for producing dextran products of the intermediate molecular weight of 5,000 to 500,000, which includes the so-called clinical range for blood volume expanders, have ordinarily required the separate steps of acid hydrolysis or pyrolysis of native dextran.

Dextranase is known to have the property of disrupting the molecules of native dextran, and this may be accomplished by the methods disclosed in copending application Serial No. 243,572, filed August 24, 1951, and now Patent No. 2,742,399, granted April 17, 1956, to Tsuchiya, Jeanes, Bricker and Wilham. However, according to that patent, the final products obtained are low molecular weight polysaccharides, such as mono-, di and trisaccharides; with some saccharides having 4, 5 or 6 glucose units per molecule.

According to the present invention, dextran of relatively high molecular weight, such as native dextran, is subjected to the action of extracellular dextranase in aqueous solutions of extremely low concentrations compared with anything heretofore attempted. The dextranase used is that elaborated by an extracellular dextranase-producing organism of the group consisting of *Penicillium lilacinum, P. funiculosum, P. verruculosum*, and *Spicaria violacea*, and is further characterized in that at high concentrations it will depolymerize high molecular weight dextran to mono-, di-, and trisaccharides whereas at low concentrations it will depolymerize high molecular weight dextran to fargments of intermediate molecular weight. The reaction is continued until a substantial proportion of dextran of intermediate molecular weight is formed, and the reaction is then stopped, as by heating the reaction mixture to a temperature substantially above 80° C. to inactivate the dextranase, and dextran fractions of intermediate molecular weight then recovered from the reaction mixture. We have discovered that by maintaining the concentration of dextranase sufficiently low the breakdown of dextran proceeds at a rate which permits interruption of the breakdown when the bulk of the cleavage products are within the desired intermediate ranges. These critical concentrations of dextranase necessary to effect the intermediate breakdown of dextran are far below that which would normally be expected from prior knowledge of the properties and utilization of the enzyme. For example, in the method disclosed in Patent No. 2,742,399, previously mentioned, concentrations of dextranase of several thousand units per 100 ml. of conversion solution are used to hydrolyze native dextran. In contrast and as an example of this invention, concentrations of the order of 5 to 25 dextranase units per 100 ml. of about 5 percent dextran solution are used. A dextranase unit is defined as that quantity of dextranase which degrades a dextran solution at pH 5.2 and 40° C. so as to produce a reducing power equivalent to one milligram of isomaltose per hour.

Further, according to the present invention, the conversion of relatively high molecular weight dextran to dextrans of intermediate molecular weight is not limited to the use of previously synthesized dextrans, but may be carried out in a solution in which dextran is simultaneously being synthesized in situ. For example, the dextranase may be caused to act in an environment in which dextran is being synthesized, either by the action of isolated dextransucrase or by whole culture methods. As will be disclosed in detail below, proper proportions of enzymes and other ingredients will lead to a dextran product of intermediate molecular weight produced directly and without the necessity for carrying out separate isolations or hydrolyses.

The dextran solutions employed in the practice of this invention may range in concentration from 2 or 3 percent up to about 25 percent, and may be native dextran as produced from microorganisms such as *Leuconostoc mesenteroides* or by dextransurcrase enzymes produced from such dextran-producing organisms. Alternatively, as explained above, the starting solutions may contain sucrose varying in concentration from about 2 or 3 percent up to about 15 percent, and may be inoculated with such dextran-producing organisms together with the essential nutrients, or alternatively the sucrose solutions may contain dextransucrase enzymes. The latter is preferred in some circumstances because contamination by fermentative by-products and residues of the nutrient substances is minimized. In either of the foregoing three alternatives, the solutions of patrially hydrolyzed dextran that are produced may be subjectd to known methods of fractionation, as by aqueous ethanol- or methanol-precipitation for the purpose of recovering sharply defined fractions of the desired dextran product.

The concentration of dextranase employed with the foregoing reactant solutions may vary in accordance with the desired intermediate molecular weight range of the final dextran product, the greater molecular weight desired requiring lesser concentrations of dextranase. It may range generally from 5 to 25 dextranase units per 100 ml. of solution. In those instances where the dextran is being formed in situ, the same relationship prevails, but additional precaution should be taken in the case of synthesis by dextransucrase to provide the system with sufficient dextransucrase to furnish the system with synthesized dextran at a rate at least as rapid as it is hydrolyzed by the dextranase. This precaution is advisable to avoid prolonged exposure of the partially hydrolyzed dextran to the action of the dextranase, lest the efficiency of the conversion be impaired by the production of an excess of low molecular weight products.

The dextranase employed may be prepared in accordance with the disclosure of Patent No. 2,742,399. In brief, the method consists of culturing an extracellular dextranase producing organism of the genera Penicillium and Spicaria, particularly one of the group consisting of *Penicillium lilacinum, P. funiculosum, P. verruculosum* and *Spicaria violacea*, in a culture medium containing dextran and a source of assimilable nitrogen for 3 to 6 days at a pH within the range of 4.0 to 9.0 and then separating the mycelial cells from the culture medium. The culture medium may be used directly in the present process, or the dextranase may be purified by precipitation with organic solvents or ammonium sulfate. In either case, it is necessary to establish the dextranase potency of the enzyme added, inasmuch as the concentration of enzyme is critical. The potency may be established by relatively simple methods, the unit of dextranase being that as previously defined.

The character of the products of the present invention as determined by the distribution of molecular weights of the cleavage products depends upon the concentration of dextranase present in the solutions, as noted above. It also depends upon the length of time over which the dextranase is permitted to act. In general, for any given set of conditions the molecular weight of the products varies inversely with the time. It is generally preferred to select conditions that will result in a maximum yield of products within the desired range within 24 to 72 hours. Shorter or longer times may be employed, however, if desired. The action of the dextranase may be conveniently stopped at any desired time by heat inactivation at a temperature substantially above 80° C. or by adjusting the pH substantially above 7.0 or substantially below 4.0. It is entirely feasible to determine the proper time at which the desired point of hydrolysis is reached by viscometric measurement and thus to gage the time factor very accurately. This may be accomplished, for example, by correlating the viscosity of the solution with the known viscosity characteristics of solutions that have been previously evaluated for optimum yield of desired products.

The conversions with dextranase should be carried out at temperatures below 80° C. and are preferably carried out between 20° C. and 50° C. The hydrogen ion concentration may vary between about pH 4.0 and about pH 7.0, and is preferably about pH 5.0.

The following specific examples illustrate the invention. It will be noted from the data of the examples that the invention affords the production of dextran cleavage products over a wide range of molecular weights. The experimental results emphasize the production of products within the so-called clinical range, i. e. that range suitable for use as blood volume expander. This is for illustrative purposes only, however.

EXAMPLE I

Varying quantities of dextranase were added to aliquots of a dextran solution buffered to pH 5.0 and then diluted to contain 5 percent dextran in each instance. After incubating portions for 24 and 48 hours at 30° C., enzymatic action was stopped by heat inactivation at 100° C. for 10 minutes. Aliquots of the incubated mixtures were then titrated with varying quantities of 95 percent alcohol and the percent dextran precipitated from each sample was determined polarimetrically. The results were summarized in Table I.

*Table I*

| Units dextranase per 100 ml. 5+ dextran | 0 | 5 | 5 | 10 | 10 | 20 | 20 |
|---|---|---|---|---|---|---|---|
| Hours' incubation | 24 | 24 | 48 | 24 | 48 | 24 | 48 |
| Percent alcohol in aliquot: | Percent total dextran precipitated | | | | | | |
| 36 | 0 | 0 | 3 | 2 | 0 | 1 | 0 |
| 38 | 6 | 0 | 0 | 0 | 6 | 1 | 2 |
| 40 | 99 | 43 | 23 | 10 | 6 | 0 | 2 |
| 41 | 100 | 53 | 35 | 18 | 7 | 3 |  |
| 42 | 100 | 61 | 39 | 28 | 10 | 5 | 1 |
| 44 | 100 | 73 | 53 | 44 | 20 | 11 | 1 |
| 46¹ | 100 | 80 | 64 | 57 | 32 | 23 | 2 |
| 48 | 100 | 85 | 73 | 68 | 42 | 33 | 7 |
| 50 | 100 | 88 | 78 | 78 | 53 | 45 | 15 |
| 55 | 100 | 93 | 88 | 84 | 65 | 67 | 37 |
| 60 | 100 | 96 | 91 | 91 | 81 | 78 | 58 |
| 70 | 100 | 98 | 97 | 95 | 92 | 90 | 85 |

¹ Approximate clinical molecular size.

EXAMPLE II

Varying quantities of dextranase plus 4,000 units of dextransucrase (which under ideal reaction conditions is sufficient to convert 4 grams sucrose per hour to dextran) were added per 100 ml. of 10 percent sucrose solution. After 26 hours incubation at 30° C. and pH 5.0, enzymatic action was stopped by heat inactivation as in Example I. Aliquots of the final solutions were titrated with varying quantities of 95 percent ethanol and the percent dextran precipitated from each sample was determined polarimetrically as in Example I. It is known that large molecular weight dextran precipitates at relatively low alcohol concentration, whereas small molecular weight dextran precipitates at higher alcohol concentration. Clinical molecular size dextran is precipitated from approximately 42 percent alcohol as the lower limit to a maximum concentration of approximately 50 percent alcohol. The results are summarized in Table II.

*Table II*

| Units dextranase per 100 ml. mixture | 0 | 10 | 25 |
|---|---|---|---|
| Percent alcohol in aliquot: | Percent total dextran precipitated | | |
| 36 | 0 | 0 | 3 |
| 38 | 35 | 13 | 2 |
| 40 | 99 | 15 | 0 |
| 41 | 99 | 18 | 0 |
| 42 | 100 | 25 | 2 |
| 44 | 98 | 37 | 4 |
| 46 | 98 | 50 | 15 |
| 48 | 97 | 63 | 26 |
| 50 | 98 | 70 | 42 |
| 55 | 100 | 85 | 78 |
| 60 | 98 | 95 | 86 |
| 70 | 100 | 100 | 100 |

We claim:

1. The method comprising subjecting dextran of relatively high molecular weight to the action of dextranase elaborated by an extracellular dextranase-producing organism selected from the group consisting of *Penicillium lilacinum, P. funiculosum, P. verruculosum*, and

*Spicaria violacea*, said dextranase being characterized in that at high concentrations it will depolymerize high molecular weight dextran to mono-, di-, and trisaccharides whereas at low concentrations it will depolymerize high molecular weight dextran to fragments of intermediate molecular weight, the reaction being conducted in an aqueous medium and the concentration of dextranase being within the range of 5 to 25 dextranase units per 100 ml. of solution, and continuing the reaction until a substantial proportion of dextran of intermediate molecular weight is formed, and stopping the reaction.

2. The method of claim 1 in which the dextran is formed in situ in the reaction medium.

3. The method of claim 1 in which the reaction is stopped by inactivating the dextranase.

4. The method of claim 1 which comprises the additional step of separating the product into fractions of predetermined molecular weight.

5. The method comprising subjecting dextran of relatively high molecular weight in aqueous medium to the action of dextranase elaborated by an extracellular dextranase-producing organism selected from the group consisting of *Penicillium lilacinum, P. funiculosum, P. verruculosum*, and *Spicaria violacea*, said dextranase being characterized in that at high concentrations it will depolymerize high molecular weight dextran to mono-, di-, and trisaccharides whereas at low concentrations it will depolymerize high molecular weight dextran to fragments of intermediate molecular weight, said dextranase being present in the range of 5 to 25 dextranase units per 100 ml. of said aqueous medium, and continuing the reaction until a substantial proportion of dextran of intermediate molecular weight is formed, the concentration of dextranase within the designated range being selected so as to produce a maximum yield of said intermediate molecular weight dextran within a period of 24 to 72 hours.

6. The method comprising subjecting an aqueous solution containing 2 to 25 percent dextran at a temperature below 80° C. and at a pH of between about 4.0 and about 7.0 to the action of dextranase elaborated by an extracellular dextranase-producing organism selected from the group consisting of *Penicillium lilacinum, P. funiculosum, P. verruculosum*, and *Spicaria violacea*, said dextranase being characterized in that at high concentrations it will depolymerize high molecular weight dextran to mono-, di-, and trisaccharides whereas at low concentrations it will depolymerize high molecular weight dextran to fragments of intermediate molecular weight, said dextranase being present in a concentration of 5 to 25 dextranase units per 100 ml. of solution until a substantial proportion of dextran of intermediate molecular weight is formed, stopping the reaction by heating to a temperature substantially above 80° C. to inactivate the dextranase and recovering fractions of intermediate molecular weight from the reaction mixture.

7. The method comprising subjecting an aqueous solution containing 2 to 15 percent sucrose to the simultaneous action of dextransucrase and dextranase, said dextranase being elaborated by an extracellular dextranase-producing organism selected from the group consisting of *Penicillium lilacinum, P. funiculosum, P. verruculosum*, and *Spicaria violacea*, said dextranase being characterized in that at high concentrations it will depolymerize high molecular weight dextran to mono-, di-, and trisaccharides whereas at low concentrations it will depolymerize high molecular weight dextran to fragments of intermediate molecular weight, the concentration of dextranase being in the range of 5 to 100 units per 100 ml. of solution and continuing the reaction until a substantial proportion of dextran of intermediate molecular weight is formed, and recovering dextran fractions from the reaction mixture.

8. The method of claim 7 in which the concentration of dextransucrase employed is sufficient to furnish the system with synthesized dextran at least as fast as it is hydrolyzed by the dextranase.

References Cited in the file of this patent

UNITED STATES PATENTS

| | | |
|---|---|---|
| 2,565,507 | Lockwood et al. | Aug. 28, 1951 |
| 2,709,150 | Carlson | May 24, 1955 |

OTHER REFERENCES

Evans et al.: Advances in Carbohydrate Chemistry, 1947, volume II, pp. 211, 216.

Chemical Abstracts 43: 3050i—Nordstrom and Hultin; 44:7382g—Hultin-Nordstrom.

Hultin et al.: Chemica Scandinavica (1949), pages 1405 to 1417.